United States Patent
Parasnis et al.

(10) Patent No.: US 7,386,475 B2
(45) Date of Patent: Jun. 10, 2008

(54) GENERATION AND EXECUTION OF CUSTOM REQUESTS FOR QUOTE

(75) Inventors: Abhay V. Parasnis, Coppell, TX (US); Mark E. Hanson, Allen, TX (US); Haidong Li, Richardson, TX (US)

(73) Assignee: i2 Technologies US, Inc., Dallas, TX (US)

( * ) Notice: Subject to any disclaimer, the term of this patent is extended or adjusted under 35 U.S.C. 154(b) by 1312 days.

(21) Appl. No.: 09/940,764

(22) Filed: Aug. 27, 2001

(65) Prior Publication Data

US 2004/0187091 A1 Sep. 23, 2004

Related U.S. Application Data

(60) Provisional application No. 60/238,329, filed on Oct. 5, 2000.

(51) Int. Cl.
*G06Q 30/00* (2006.01)
(52) U.S. Cl. ...................................................... 705/26
(58) Field of Classification Search .................. 705/26, 705/27
See application file for complete search history.

(56) References Cited

U.S. PATENT DOCUMENTS

| | | | |
|---|---|---|---|
| 5,630,069 A | 5/1997 | Flores et al. ................ | 395/207 |
| 5,734,837 A | 3/1998 | Flores et al. ................ | 395/207 |
| 5,758,327 A * | 5/1998 | Gardner et al. ............... | 705/26 |
| 5,758,328 A * | 5/1998 | Giovannoli ................... | 705/26 |
| 5,991,733 A | 11/1999 | Aleia et al. ..................... | 705/8 |
| 6,115,690 A | 9/2000 | Wong ............................. | 795/7 |
| 6,892,185 B1 * | 5/2005 | Van Etten et al. ............ | 705/27 |
| 7,117,165 B1 * | 10/2006 | Adams et al. ................. | 705/26 |

OTHER PUBLICATIONS

Philip McCrea "Trends in Electronic Procurement", CSIRO, Dec. 1997.*
PCT, Notification of Transmittal of the International Search Report or the Declaration, 4 pages, Aug. 14, 2002.

* cited by examiner

*Primary Examiner*—Naeem Haq
(74) *Attorney, Agent, or Firm*—Booth Udall, PLC

(57) ABSTRACT

A request for quote (RFQ) engine (10) includes a data and metrics designer (22) that generates, in response to input from a user, a data and metrics model (42) for an RFQ template using a data and metrics meta-model (32). The RFQ engine (10) also includes a state transition designer (24) that generates, in response to input from the user, a state transition model (44) for the RFQ template using a state transition meta-model (34). Furthermore, the RFQ engine (10) includes a workflow designer (26) that generates, in response to input from the user, a user interface workflow (46) for the RFQ template using a workflow meta-model (36). In addition, the RFQ engine includes an execution engine (40) that executes the RFQ template that includes the data and metrics model (42) generated by the data and metrics designer (22), the state transition model (44) generated by the state transition designer (24), and the user interface workflow (46) generated by the workflow designer (26). The RFQ template is executed to generate an RFQ.

13 Claims, 3 Drawing Sheets

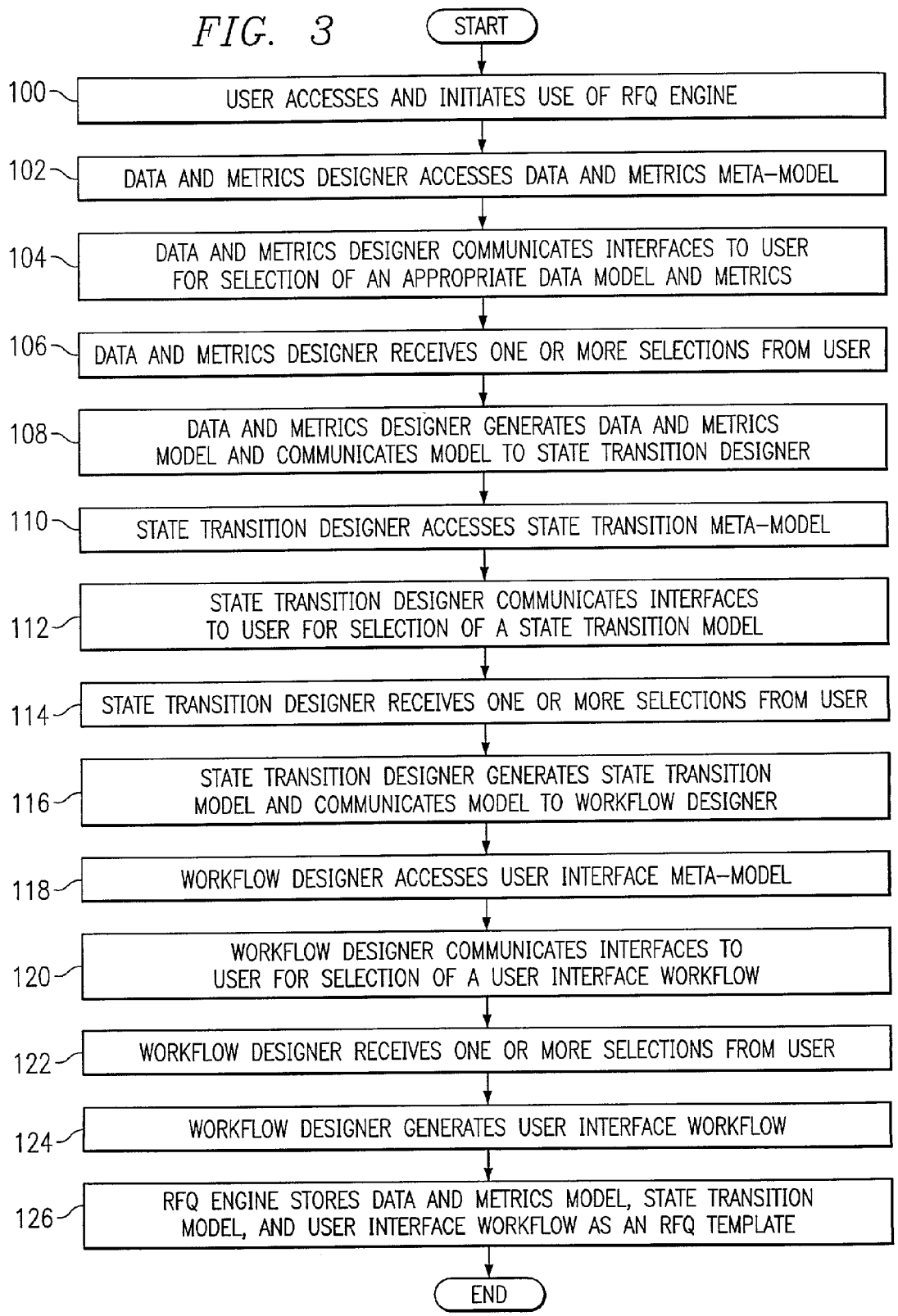

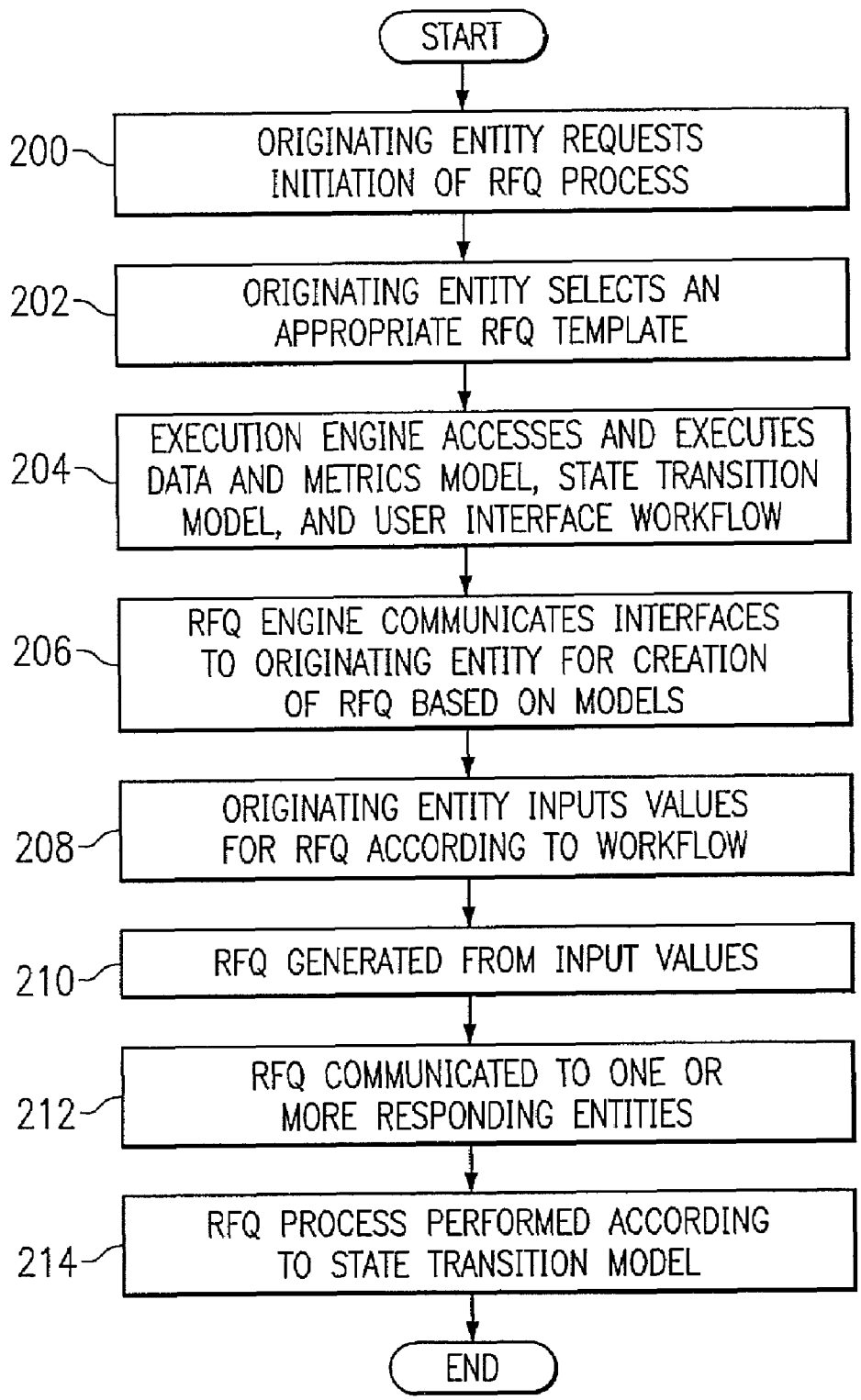

GENERATION AND EXECUTION OF CUSTOM REQUESTS FOR QUOTE

RELATED APPLICATION

This application claims benefit under 35 U.S.C. § 119(e) of U.S. Provisional Application Ser. No. 60/238,329, filed Oct. 5, 2000, entitled "RFQ TEMPLATE ENGINE."

TECHNICAL FIELD OF THE INVENTION

This invention relates to the field of business transactions, and more particularly to generation and execution of custom requests for quote.

BACKGROUND OF THE INVENTION

When a business wishes to acquire a product or service from a supplier, the business will often generate a request for quote (RFQ) that details the various requirements the business has regarding the desired product or service. For example, an RFQ may include an identifier of the desired product (such as a part number or the part numbers of the components of the product), a desired price and quantity, and a location to which the product is to be shipped. The business sends the RFQ to one or more suppliers and the suppliers may then bid or otherwise respond to the RFQ. RFQs are used in a broad and diverse range of industries and within each of these industries a variety of different types of RFQs are used to fulfill various purchasing and servicing needs. The actual details of how each of these RFQs are generated and communicated between a business and a supplier may vary significantly depending on the nature of the product or service for which a quote is requested, the size and type of purchaser or supplier, the type of industry, and many other factors. As a result, RFQ engines that are designed to generate and communicate RFQs for a specific industry can often not be used by businesses in other industries. Alternatively, generic RFQ engines that are designed to apply to a number of industries are often too simplistic to fulfill a business' needs and may cause the business to resort to other methods (such as telephone, email, or fax communications) to complete an RFQ transaction.

SUMMARY OF THE INVENTION

According to the present invention, disadvantages and problems associated with previous RFQ engines have been substantially reduced or eliminated.

According to one embodiment of the present invention, a request for quote (RFQ) engine including a data and metrics designer that generates, in response to input from a user, a data and metrics model for an RFQ template using a data and metrics meta-model. The RFQ engine also includes a state transition designer that generates, in response to input from the user, a state transition model for the RFQ template using a state transition meta-model. Furthermore, the RFQ engine includes a workflow designer that generates, in response to input from the user, a user interface workflow for the RFQ template using a workflow meta-model. In addition, the RFQ engine includes an execution engine that executes the RFQ template that includes the data and metrics model generated by the data and metrics designer, the state transition model generated by the state transition designer, and the user interface workflow generated by the workflow designer. The RFQ template is executed to generate an RFQ.

Particular embodiments of the present invention provide one or more technical advantages. For example, particular embodiments provide a flexible data model that may be tailored to capture selected structured and unstructured data relating to an RFQ or other business process and provides metrics or rules that may be used to evaluate the data. Therefore, a business may configure an RFQ process that is based on selected parameters (for example, price, quantity, shipping location, shipping costs, delivery time, taxes, and quantity discounts), that collects data from various suppliers for one or more of these parameters, and that evaluates the data to determine, for example, one or more optimal suppliers.

Certain embodiments of the present invention also provides a state transition model that may be tailored by a business to execute an appropriate sequence and type of communications between the business and a supplier regarding a RFQ generated by the business. For example, if a sealed bid process is used where bids are communicated by e-mail, then the state transition model may be configured to implement the steps performed during this type of negotiation. Furthermore, particular embodiments provide a user interface workflow that may be configured to create an appropriate sequence of user interfaces (a workflow) to implement an RFQ process. The user interface workflow may be based on the what data is to be collected (according to the data model) and what type of negotiation process is used (according to the state transition model). In addition, the user interface workflow may also be tailored based on the level of skill of the user.

Other technical advantages may be readily apparent to those skilled in the art from the figures, description and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 3 illustrates an example method of generating an RFQ template using an example RFQ engine; and FIG. 4 illustrates an example method of executing an RFQ template using an example RFQ engine.

DESCRIPTION OF EXAMPLE EMBODIMENTS

Figure 1:
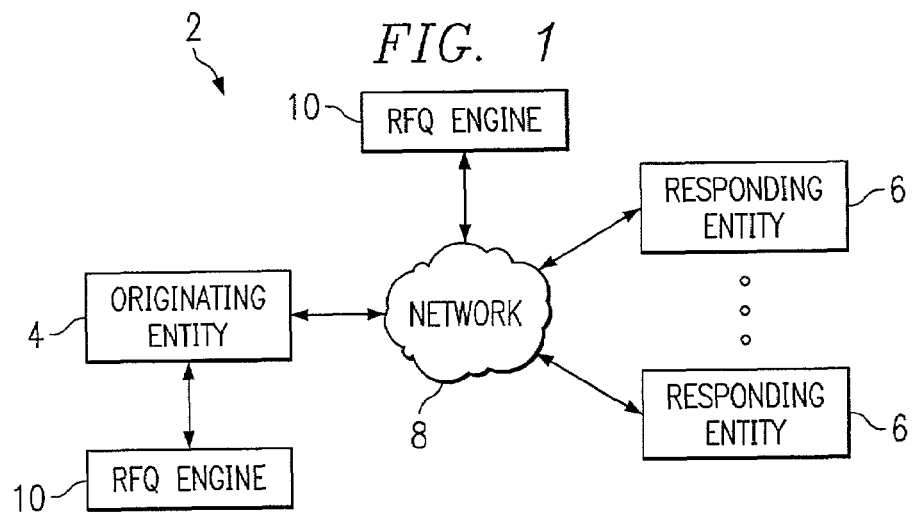
FIG. 1 illustrates an example electronic commerce system for enabling business transactions.

FIG. 1 illustrates an example electronic commerce system 2 for enabling business transactions, such as the generation of and execution of requests for quotes (RFQs). System 2 includes one or more businesses or other entities 4 originating an RFQ (the "originating entities") and one or more businesses or other entities 6 responding to the RFQ (the "responding entities"), such as suppliers of a product or service that is the subject of an RFQ. The terms "request for quote" and "RFQ" shall be used to refer not only to requests for quotes, but to any other appropriate business transactions originated by an originating entity 4 and communicated to a responding entity 6 for a response that addresses one or more parameters of the business transition specified by originating entity 4. Originating entity 4 and responding entities 6 may communicate using a network 8. Network 8 may include any appropriate combination of public and/or private networks coupling originating entity 4 and responding entities 6. In an example embodiment, network 8 includes the Internet and any appropriate local area networks (LANs), metropolitan area networks (MANs), or wide area networks (WANs) coupling originating entity 4 and responding entities 6 to the Internet.

In the past, originating entities 4 have used RFQ engines to generate RFQs. However, these RFQ engines have typically been either highly focused to address the needs of originating entities in a particular industry (and thus are not applicable to other industries) or have been highly generic to address the needs of originating entities in most, if not all, industries (and thus are not detailed enough to meet all of the RFQ needs of most industries). Particular embodiments of the present invention provide an RFQ engine 10 that not only is applicable to almost any industry segment, but that also provides features to meet most, if not all of, the needs of most industry segments. RFQ engine 10 provides these capabilities by allowing a user, such as originating entity 4, to create custom RFQs for specific industries and for specific transactions in each industry. RFQ engine 10 may be implemented as any appropriate combination of software and/or hardware and may be associated with or separate from originating entity 4. For example, RFQ engine 10 may be operated in association with a computer of originating entity 4 or RFQ engine 10 may be separate from originating entity 4 and coupled to network 8 such that originating entity 4 or any other entity may access and use RFQ engine 10.

Figure 2:
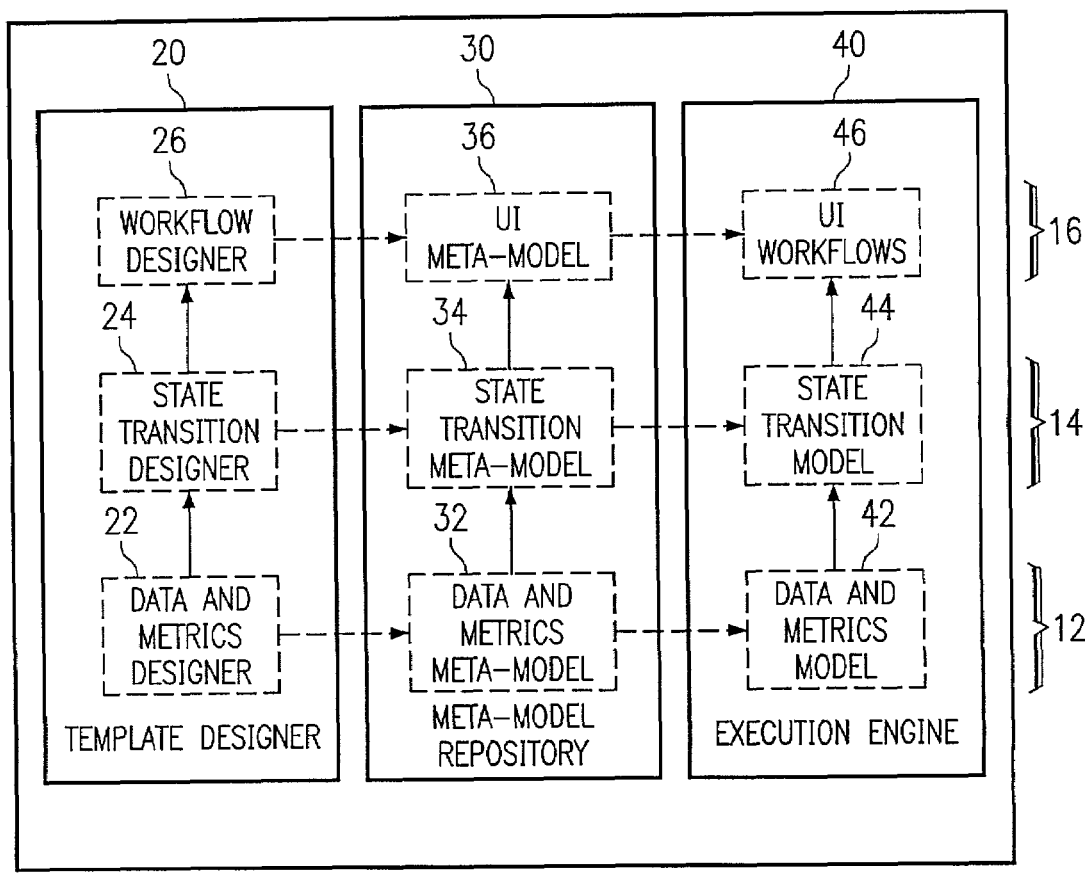
FIG. 2 illustrates example functional components of an RFQ template engine.

FIG. 2 illustrates example functional components of RFQ engine 10. RFQ engine 10 provides a business or other entity with the ability to define and execute multi-parametric RFQ business processes and to configure metrics to evaluate the data received in response to RFQs generated in the business process. The components of RFQ engine 10 may be organized logically into three tiers: a data and metrics tier 12, a state transition tier 14, and a user interface workflow tier 16. Logical tiers 12, 14, and 16 represent the ability of RFQ engine 10 to customize three different aspects of an RFQ business process to meet the varying needs of entities using RFQ engine 10.

The components of data and metrics tier 12 provide the ability to configure and execute a flexible data model that may be tailored to capture selected structured and unstructured data relating to an RFQ or other business process. Therefore, these components allow engine 10 to capture a varying amount of data from both originating entities 4 and responding entities 6. This data may include details relating to the RFQ (such as product or service requirements, due dates, and participation rules and restrictions), demand data (such as the required quantity of a product or service over a period of time), and various attachments (such as a design document, legal terms, and shipping/logistics details). As can be seen from these examples, the collected data may be structured (for example, the delivery date may be entered in a specific format and the price may be entered in a particular currency) and/or unstructured (for example, an attachment such as a text document). The type and amount of data collected may vary significantly between various industries and even between different businesses in the same industry; however, RFQ engine 10 allows a business to tailor the data that is collected to suit the business' needs for a particular type of transaction.

In addition to providing flexibility in the collection of RFQ data, the components of data and metrics tier 12 also provide and execute metrics or rules that may be used to evaluate the data. Since RFQ engine 10 enables the collection of structured data having a defined format and content, RFQ engine 10 also provides for the evaluation of this structured data using one or more rules. The types of rules applied may be selected to meet the specific needs of a business and may be tailored based on the type of data that is to be collected. For example, RFQ engine 10 may provide rules that evaluate responses to an RFQ to determine one or more optimal suppliers from which a product or service may be purchased.

The components of state transition tier 14 provide the ability to configure and execute a state transition model or "machine" that may be tailored by an originating entity 4 to facilitate an appropriate sequence and type of communications between originating entity 4 and responding entities 6 regarding an RFQ generated by the business. For example only, if a sealed bid, multi-round bidding process is to be used where bids are communicated by e-mail, then the state transition model may be configured to implement the steps performed during this type of negotiation. Therefore, when a business has configured the type of data to be collected for an RFQ and for responses to the RFQ, the business may also configure how and in what order the data is to be collected and exchanged between the relevant parties and the actions that result from one or more steps in this data collection and exchange process.

The components of user interface workflow tier 16 provide the ability to configure and execute a user interface model that provides an appropriate sequence of user interfaces (a user interface workflow) to implement an RFQ process. The user interface workflow may be based on the data that is to be collected (according to the data model) and the type of negotiation process that is used (according to the state transition model). In addition, the user interface workflow may also be tailored based on the level of skill of the user. For example, for novice users the user interface workflow may be configured to provide a "wizard" interface that takes the users through a series of easy to follow steps to complete an RFQ or to evaluate responses to an RFQ. Alternatively, advanced users may be provided a single-step form that enables an RFQ to be completed quickly and efficiently and may be provided advanced options and flexibility when evaluating a responses to an RFQ.

Logical tiers 12, 14, and 16 may be implemented in three example subsystems of RFQ engine 10: a template designer 20, a meta-model repository 30, and an execution engine 40. As is illustrated in FIG. 2, each subsystem may include a component from each tier 12, 14, and 16. Subsystems 20, 30, and 40 and their components may be implemented as any appropriate combination of software and/or hardware executing in one or more computers at one or more locations. In the example RFQ engine 10, template designer 20 includes a data and metrics designer 22 from data and metrics tier 12, a state transition designer 24 from state transition tier 14, and a workflow designer 26 from user interface workflow tier 16. Each of these components may be used to design a model of a portion of an RFQ process using a corresponding meta-model in meta-model repository 30, described below.

Designers 22, 24, and 26 may be implemented together or separately as any appropriate combination of software and/or hardware operating in association with one or more computers. In particular embodiments, designers 22, 24, and 26 present one or more graphical user interfaces to a user, such as an originating entity, that allow the user to select information from the meta-models in meta-model repository 30 to create one or more models to be executed using execution engine 40. Although designers 22, 24, and 26 are illustrated as separate components of template designer 20, in particular embodiments these components may be integrated into a single software application, related modules of a software application, different software applications, or any other appropriate arrangement. Designers 22, 24, and 26 may be implemented as any appropriate combination of hardware and/or software operating in conjunction with one or more computers.

The example meta-models in meta-model repository 30 that may be used to create these models include a data and metrics meta-model 32, a state transition meta-model 34, and a user interface meta-model 36. Data and metrics meta-model 32 defines the parameters for which data may be collected from the originating entity 4 and the responding entities 6 during an RFQ process. Therefore, a user of RFQ engine 10 may configure a custom RFQ process using data and metrics designer 22 by selecting particular parameters from data and metrics meta-model 32 that will apply to that process and form a data and metrics model 42 for that process. These parameters may be defined using an extensible markup language (XML) format, a relational format, or any other appropriate technique. Any appropriate properties of the parameters may be defined in data and metrics meta-model 32. Such defined properties of a parameter may include, but are not limited to, name, description, scope, creator, data type, cardinality, ownership, permission masks, visibility, and dependency maps with other parameters defined in data and metrics meta-model 32.

In addition to defining the various parameters that may be used in an RFQ process and included in data and metrics model 32, data and metrics meta-model 32 also defines rules or metrics that may be used to evaluate data associated with the parameters. Since data and metrics meta-model 32 defines the properties of the parameters, meta-model 32 facilitates the structured entry of data for the parameters during the RFQ process by the originating entity 4 and responding entities 6. Furthermore, since the data is entered in a structured format, the data may be readily evaluated using rules that are pre-defined in data and metrics meta-model 32. Such rules enable an originating entity to quickly and efficiently evaluate a large number of responses to an RFQ. Any appropriate rules may be defined in data and metrics meta-model 32. Such rules may include, but are not limited to, comparison rules, ordering rules, complex computational rules (for example, using dependency maps), and objective evaluation functions and solvers. The rules may be defined using XML documents, JAVA classes that are loaded using reflection, linear programming solvers, or any other appropriate techniques. Data and metrics designer 22 may present the parameters and metrics included in data and metrics meta-model 32 to a user and receive selections of parameters and metrics from the user to create data and metrics model 42 using any appropriate technique or techniques.

Meta-model repository 30 also includes a state transition meta-model 34 that contains a number of different states that may be combined in any appropriate sequence of state transitions to create a state transition model 44 representing the flow of an RFQ process. State transition meta-model 34 may also include pre-defined sequences of state transitions that a user may select, using state transition designer 24, without having to select each state individually and indicate a desired sequence of the states (and thus create state transition model 44). For example, state transition designer 24 may present one or more predefined sequences to a user, such as originating entity 4, and the user may select a desired pre-defined sequence. Predefined sequences may be provided for an open bidding RFQ process, a sealed bid RFQ process, a single round negotiation process, a multiple round negotiation process, and many other types of RFQ processes. Furthermore, the user may modify a predefined sequence to create state transition model 44. In addition, state transition designer 24 may present a number of individual states to the user and the user may select a number of different states and the order of transitions between the states to create state transition model 44. State transition designer 24 may use any appropriate user interface that allows the user to make such selections.

Meta-model repository 30 further includes a user interface meta-model 36 containing a number of different user interfaces and/or components of user interfaces that may be combined in any appropriate sequence to create a user interface workflow 46 that may be used to prepare an RFQ, respond to an RFQ, and/or evaluate responses to an RFQ. User interface meta-model 36 may also include pre-defined user interface workflows that a user may select, using workflow designer 26, without having to select each user interface or user interface component individually and indicate a desired sequence of user interfaces. For example, workflow designer 26 may present one or more predefined workflows to a user, such as originating entity 4, and the user may select a desired pre-defined workflow. For example, pre-defined "wizard-type" workflows may be provided for novice users and predefined single-step workflows may be provided for advanced users. Furthermore, the user may modify a predefined workflow to meet the user's needs. In addition, workflow designer 26 may present a number of user interfaces and/or components of user interfaces to the user and the user may "build" a number of different user interfaces and the order in which the interfaces are presented to a user to create a custom workflow. Workflow designer 26 may use any appropriate user interface that allows the user to make such selections.

The design of models 42, 44, and 46 associated with tiers 12, 14, and 16 may be interrelated. For example, the parameters and metrics chosen in a particular data and metrics model 42 may affect the state transition model 44, and both of these models 42 and 44 may affect the user interface workflow 46. For instance, if data for certain parameters is to be specified by originating entity 4 when generating an RFQ or obtained from a responding entity 6 in a response to an RFQ, the sequence of state transitions in state transition model 44 or the design and sequence of the user interfaces in user interface workflow 46 may reflect the need to collect this information from a user. Furthermore, state transition sequence 44 will often have an effect on user interface workflow 46, since many of the transitions between states may be reflected in a change in the user interface presented to the user. For example, if the states include multiple bidding rounds, user interfaces may be provided in sequence for each of these rounds. Since the design of models 42, 44, and 46 may be interrelated, designers 22, 24, and 26 may be implemented together or separately and models 42, 44, and 46 may be designed together as a single RFQ model or separately and then later integrated during execution.

As described above, example RFQ engine 10 includes an execution engine 40 that may be used to execute the models 42, 44, and 46 associated with a particular custom RFQ template created using designers 22, 24, and 26. This execution may include actually executing the models 42, 44, and 46 as independent or integrated software modules. Alternatively, the models may be used to instantiate an RFQ based on the models 42, 44, and 46 and this instantiation may be executed and an associated user interface workflow may be communicated to originating entity 4 and/or responding entities 6. Furthermore, models 42, 44, and 46 may be executed using any other appropriate technique.

FIG. 3 illustrates an exemplary method of generating an RFQ template using RFQ engine 10. The method begins at step 100 where a user, such as originating entity 4, accesses RFQ engine 10 and initiates the use of RFQ engine 10 to create a custom RFQ template. At step 102, data and metrics designer 22 accesses data and metrics meta-model 32 to determine the types of data and metrics that may be used in conjunction with an RFQ template created using RFQ engine 10. Based on data and metrics meta-model 42, data and metrics designer 22 communicates one or more user interfaces to the user at step 104 to allow the user to select or create appropriate data and metrics to be used in the RFQ template. For example, data and metrics designer 22 may provide the user with a list of types of data that an originating entity 4 should be requested to enter when generating an RFQ from the custom RFQ template, a list of types of data that a responding entity 6 should be requested to enter when responding to the RFQ, and a list of metrics that may be used to evaluate data values entered by responding party 6 and/or originating party 4. The user may select particular data and then associate one or more metrics that may be used to evaluate the data.

At step 106, data and metrics designer 22 receives one or more selections from the user relating to the data and metrics to be included in the RFQ template. Data and metrics designer 22 uses these selections at step 108 to generate a data and metrics model 42 for the RFQ template being created. In particular embodiments, data and metrics designer 22 also communicates data and metrics model 42 to state transition designer 24 and/or communicates data and metrics model 42 to a data storage location accessible to designer 24 (and possibly designer 26) or any other appropriate components of RFQ engine 10.

At step 110, state transition designer 24 accesses state transition meta-model 34 to determine the various state transitions that may be used to create the custom RFQ template. Based on state transition meta-model 34, state transition designer 24 communicates one or more user interfaces to the user at step 112 to allow the user to select or create an appropriate state transition to be used in the RFQ template. For example, state transition designer 24 may present one or more predefined state sequences to the user and the user may select a desired pre-defined sequence. As described above, predefined sequences may be provided for an open bidding RFQ process, a sealed bid RFQ process, a single round negotiation process, a multiple round negotiation process, and many other types of RFQ processes. Furthermore, the interfaces communicated to the user may allow the user modify a predefined sequence or to select a number of different states and the order of transitions between the states. In particular embodiments, the pre-defined state sequences and/or the individual states available for selection by the user (and the order in which the individual states may be grouped) may be based on the data or metrics model 42 created by the user.

State transition designer 24 receives one or more selections from the user relating to the state transition to be used in the RFQ template at step 114. At step 116, state transition designer 24 uses these selections to generate a state transition model 44 for the RFQ template being created. In particular embodiments, state transition designer 24 also communicates state transition model 44 to workflow designer 26 and/or communicates state transition model 44 to a data storage location accessible to designer 26 or any other appropriate components of RFQ engine 10.

At step 118, workflow designer 26 accesses workflow meta-model 36 to determine the various user interfaces and user interface workflows that may be used to create the RFQ template. Based on workflow meta-model 34, workflow designer 26 communicates one or more user interfaces to the user at step 120 to allow the user to select or create an appropriate user interface workflow to be used in the RFQ template. For example, workflow designer 26 may present one or more predefined user interface workflows to the user and the user may select a desired pre-defined workflow. As described above, predefined sequences may be provided to accommodate a number of different user skill levels. For example, pre-defined "wizard-type" workflows may be provided for novice users and predefined single-step workflows may be provided for advanced users. Furthermore, the user may modify a predefined workflow to meet the user's needs. In addition, workflow designer 26 may present a number of user interfaces and/or components of user interfaces to the user and the user may "build" a number of different user interfaces and the order in which the interfaces are presented to a user to create a custom workflow. In particular embodiments, the predefined workflows and/or the user interfaces or user interface components available for selection by the user (and the order in which the user interfaces or user interface components may be grouped) may be based on the data and metrics model 42 created by the user and/or the state transition model 44 created by the user.

Workflow designer 26 receives one or more selections from the user relating to the user interface workflow to be used in the RFQ template at step 122. At step 124, workflow designer 26 uses these selections to generate a user interface workflow 46 for the RFQ template being created. RFQ engine 10 stores the user interface workflow 46, along with data and metrics model 42 and state transition model 44, in an appropriate storage location at step 126, and the method ends. Models 42, 44, and 46 may be stored separately (although they may be stored in the same storage location) or they may be integrated and stored together. In either case, models 42, 44, and 46 may be accessed and executed as a single RFQ template.

FIG. 4 illustrates an exemplary method of executing an RFQ template using RFQ engine 10 to create an RFQ. The method begins at step 200 where an originating entity 4 communicates a request to RFQ engine 10 to initiate an RFQ process. At step 202, RFQ engine 10 identifies the RFQ templates that are available to be executed (such as RFQ templates previously created by the originating entity 4) and originating entity 4 communicates the selection of an appropriate RFQ template to RFQ engine 10. At step 204, execution engine 40 accesses the selected RFQ template, which includes the associated models 42, 44, and 46, and executes the RFQ template. Alternatively, RFQ engine 10 may communicate the RFQ template to originating entity 4 and originating entity 4 may execute the RFQ template (using an execution engine such as engine 40). RFQ engine 10 communicates the interfaces generated by the execution of the selected RFQ template to originating entity 4 at step 206 (or if originating entity 4 executes the template itself this step may include communicating the user interfaces to an appropriate user within originating entity 4).

At step 208, a user associated with originating entity 4 enters data values and other information in the user interfaces to create an RFQ from the RFQ template. The content and order of these user interfaces is determined, at least in part, by the user interface workflow associated with the selected RFQ template. The information input by the user is communicated to RFQ engine 10 and RFQ engine 10 generates an RFQ based on the information at step 210. Alternatively, the RFQ may be generated by a component, such as an execution engine 40, associated with originating entity 4. At step 212, the RFQ is communicated to one or more responding entities 6 identified in the RFQ or otherwise identified by originating entity 4. The RFQ process is then performed according to the state transition model 44 associated with the RFQ, and the method ends. The performance of the RFQ process may include any number of appropriate steps and originating entity 4 and responding entities 6 may input appropriate information into user interfaces one or more times to complete the RFQ process.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented system for generating a request for quote (RFQ), comprising:
   one or more computer systems comprising:
      an RFQ engine comprising one or more components, wherein the one or more components are organized logically into one or more applications, the RFQ engine comprising:
         a data and metrics application, the data and metrics application receives input from a user and generates a data and metrics model for an RFQ template using a data and metrics meta-model;
         a state transition application, the state transition application receives input from the user and generates a state transition model for the RFQ template using a state transition meta-model;
         a workflow application, the workflow application receives input from the user and generates a user interface workflow for the RFQ template using a workflow meta-model; and
         an execution engine operable to execute the RFQ template comprising the data and metrics model generated by the data and metrics application, the state transition model generated by the state transition application, and the user interface workflow generated by the workflow application, the RFQ template being executed to generate an RFQ.

2. The system of claim 1, wherein the state transition model defines a sequence of steps performed in association with the generation of the RFQ by an originating entity and a response to the generated RFQ by one or more responding entities.

3. The system of claim 2, wherein the state transition model defines a series of steps performed during a negotiation between the originating entity and the responding entities.

4. A method for generating a request for quote (RFQ), comprising:
   using a data and metrics designer, generating a data and metrics model for an RFQ template using a data and metrics meta-model and input from a user;
   using a state transition designer, generating a state transition model for the RFQ template using a state transition meta-model and input from the user;
   using a workflow designer, generating a user interface workflow for the RFQ template using a workflow meta-model and input from the user; and
   using an execution engine, executing the RFQ template comprising the data and metrics model generated by the data and metrics designer, the state transition model generated by the state transition designer, and the user interface workflow generated by the workflow designer, the RFQ template being executed to generate an RFQ.

5. The method of claim 4, wherein the state transition model defines a sequence of steps performed in association with the generation of the RFQ by an originating entity and a response to the generated RFQ by one or more responding entities.

6. The method of claim 5, wherein the state transition model defines a series of steps performed during a negotiation between the originating entity and the responding entities.

7. Software for generating a request for quote (RFQ), the software embodied in a computer-readable medium and, when executed, operable to:
   generate a data and metrics model for an RFQ template using a data and metrics meta-model and input from a user;
   generate a state transition model for the RFQ template using a state transition meta-model and input from the user;
   generate a user interface workflow for the RFQ template using a workflow meta-model and input from the user; and
   execute the RFQ template comprising the data and metrics model generated by the data and metrics designer, the state transition model generated by the state transition designer, and the user interface workflow generated by the workflow designer, the RFQ template being executed to generate an RFQ.

8. The software of claim 7, wherein the state transition model defines a sequence of steps performed in association with the generation of the RFQ by an originating entity and a response to the generated RFQ by one or more responding entities.

9. The software of claim 8, wherein the state transition model defines a series of steps performed during a negotiation between the originating entity and the responding entities.

10. A computer-implemented system for generating a request for quote (RFQ), comprising:
   one or more computer systems comprising:
      an RFQ engine comprising one or more components, wherein the one or more components are organized logically into one or more applications, the RFQ engine comprising:
         means for generating a data and metrics model for an RFQ template using a data and metrics meta-model and input from a user;
         means for generating a state transition model for the RFQ template using a state transition meta-model and input from the user;
         means for generating a user interface workflow for the RFQ template using a workflow meta-model and input from the user; and
         means for executing the RFQ template comprising the data and metrics model generated by a data and metrics application, the state transition model generated by a state transition application, and the user interface workflow generated by a workflow application, the RFQ template being executed to generate an RFQ.

11. A computer-implemented system for generating a request for quote (RFQ), comprising:
one or more computer systems comprising:
an RFQ engine comprising one or more components, wherein the one or more components are organized logically into one or more applications, the RFQ engine comprising:
a data and metrics application, the data and metrics application receives input from an entity originating an RFQ and generates a data and metrics model for an RFQ template using a data and metrics meta-model;
a state transition application, the state transition application receives input from the originating entity and generates a state transition model for the RFQ template using a state transition meta-model;
a workflow application, the workflow application receives input from the originating entity and generates a user interface workflow for the RFQ template using a workflow meta-model; and
an execution engine operable to execute the RFQ template comprising the data and metrics model generated by the data and metrics application, the state transition model generated by the state transition application, and the user interface workflow generated by the workflow application, the RFQ template being executed to generate the RFQ;
the data and metrics model defining data to be collected from the originating entity and one or more entities responding to the RFQ, the data and metrics model further defining one or more metrics used to evaluate at least a portion of the collected data;
the state transition model defining a sequence of steps performed during a negotiation between the originating entity and the responding entities relating to the RFQ;
the user interface workflow defining a sequence of user interfaces presented to the originating and responding entities in association with the generation of and response to the RFQ.

12. A method for generating a request for quote (RFQ), comprising:
using a data and metrics designer, generating a data and metrics model for an RFQ template using a data and metrics meta-model and input from an entity originating an RFQ;
using a state transition designer, generating a state transition model for the RFQ template using a state transition meta-model and input from the originating entity;
using a workflow designer, generating a user interface workflow for the RFQ template using a workflow meta-model and input from the originating entity; and
using an execution engine, executing the RFQ template comprising the data and metrics model generated by the data and metrics designer, the state transition model generated by the state transition designer, and the user interface workflow generated by the workflow designer, the RFQ template being executed to generate an RFQ;
the data and metrics model defining data to be collected from the originating entity and one or more entities responding to the RFQ, the data and metrics model further defining one or more metrics used to evaluate at least a portion of the collected data;
the state transition model defining a sequence of steps performed during a negotiation between the originating entity and the responding entities relating to the RFQ;
the user interface workflow defining a sequence of user interfaces presented to the originating and responding entities in association with the generation of and response to the RFQ.

13. Software for generating a request for quote (RFQ), the software embodied in a computer-readable medium and, when executed, operable to:
generate a data and metrics model for an RFQ template using a data and metrics meta-model and input from an entity originating an RFQ;
generate a state transition model for the RFQ template using a state transition meta-model and input from the originating entity;
generate a user interface workflow for the RFQ template using a workflow meta-model and input from the originating entity; and
execute the RFQ template comprising the data and metrics model generated by the data and metrics designer, the state transition model generated by the state transition designer, and the user interface workflow generated by the workflow designer, the RFQ template being executed to generate an RFQ;
the data and metrics model defining data to be collected from the originating entity and one or more entities responding to the RFQ, the data and metrics model further defining one or more metrics used to evaluate at least a portion of the collected data;
the state transition model defining a sequence of steps performed during a negotiation between the originating entity and the responding entities relating to the RFQ;
the user interface workflow defining a sequence of user interfaces presented to the originating and responding entities in association with the generation of and response to the RFQ.

* * * * *